United States Patent [19]

Johansson et al.

[11] 3,958,550
[45] May 25, 1976

[54] AIR RIFLE
[75] Inventors: Lennart J. I. Johansson; Bjorn W. Lindqvist, both of Eskilstuna; Eric V. Wallberg, Vallingby, all of Sweden
[73] Assignee: Forenade Fabriksverken, Eskilstuna, Sweden
[22] Filed: Apr. 30, 1974
[21] Appl. No.: 465,686

[30] Foreign Application Priority Data
May 4, 1973 Sweden.............................. 7306301

[52] U.S. Cl................................... 124/67; 124/40; 403/315
[51] Int. Cl.[2] ...................... F41B 11/00; F41F 1/04
[58] Field of Search ............. 124/15, 37, 40; 42/16, 42/17, 23, 24, 25; 46/28, 201; 285/271; 403/315, 152, 154, 155

[56] References Cited
UNITED STATES PATENTS

| | | | |
|---|---|---|---|
| 461,224 | 10/1891 | Stanly | 124/15 |
| 1,045,373 | 11/1912 | Cook | 124/15 |
| 2,662,335 | 12/1953 | Calverley | 46/28 X |
| 2,735,736 | 2/1956 | Laubender | 403/155 |

FOREIGN PATENTS OR APPLICATIONS

| | | | |
|---|---|---|---|
| 978,502 | 12/1964 | United Kingdom | 124/15 |
| 799,805 | 8/1958 | United Kingdom | 124/15 |
| 378,727 | 7/1964 | Switzerland | 124/15 |
| 1,180,276 | 10/1964 | Germany | 124/15 |

*Primary Examiner*—Richard C. Pinkham
*Assistant Examiner*—Richard T. Stouffer
*Attorney, Agent, or Firm*—Eric Y. Munson

[57] ABSTRACT

An air rifle having a casing with a compression cylinder displaceably housed therein, and including a spring actuated piston, the cylinder having a front end wall with a transverse bore, tensioning structure for compressing the spring pivotally connected to the underside of the rifle, comprising a tension lever and a tension draw bar, the tension draw bar having a head portion projecting into the bore to enable the tension draw bar to be pivoted with respect to the axis of the bore, and plug elements supporting the head portion disposed on each side of the head portion so that the plug elements bear against the head portion and against the casing.

7 Claims, 7 Drawing Figures

U.S. Patent    May 25, 1976    3,958,550
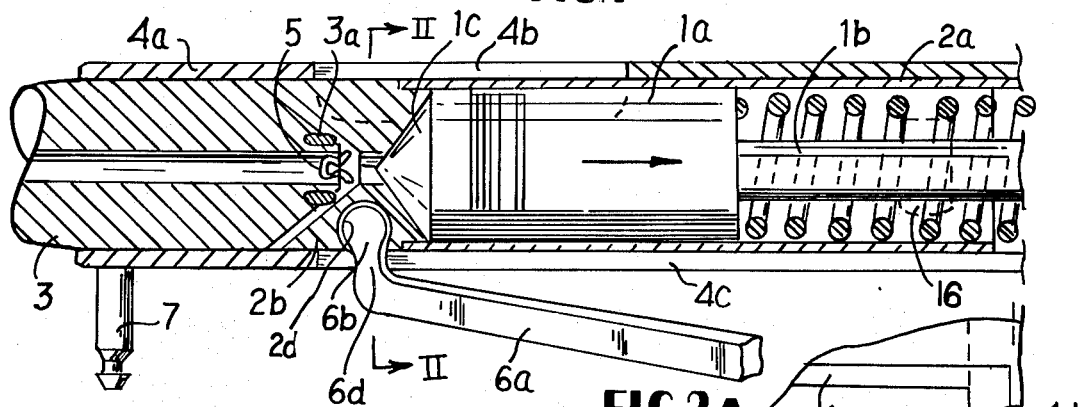
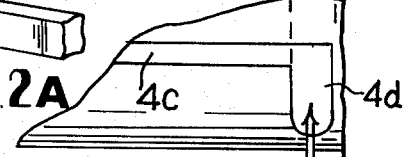
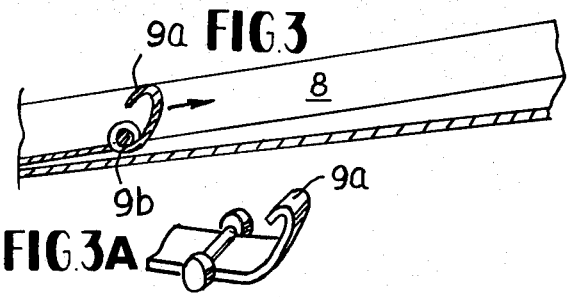
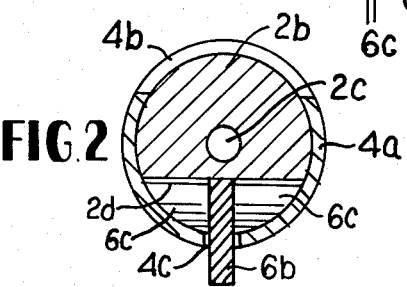
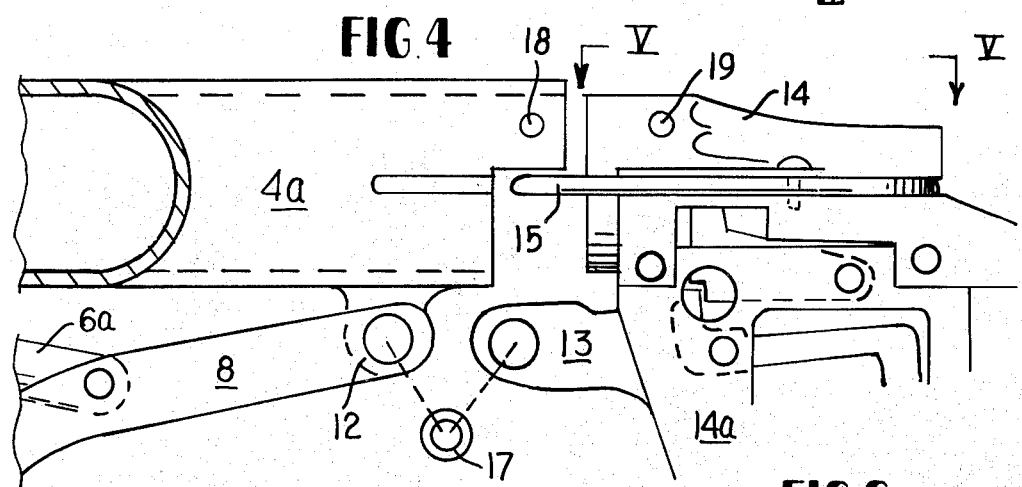
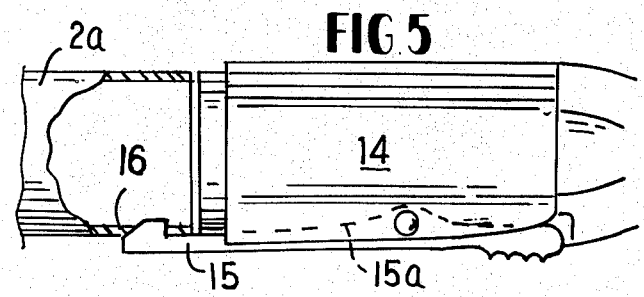
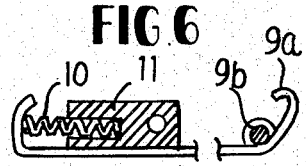

AIR RIFLE

BACKGROUND OF THE INVENTION

The present invention refers to an air rifle of the type comprising a tubular casing, a barrel mounted in the casing, a compression cylinder displaceable within the casing and a spring actuated piston movable in the same. A tension mechanism for stretching the piston spring comprising a tension lever which is pivotally mounted at the rear portion of the casing. A tension draw bar which projects into the casing through a longitudinal slot is pivotally mounted on the compression cylinder and is connected to the tension lever.

In such air rifles the spring is stretched by moving the compression cylinder rearwardly by means of the tension mechanism thereby bringing the piston to a cocked position by hooking it on a member forming an intergral part of a firing mechanism. This operation makes the rear end of the barrel accessible through an exposed opening in the casing so that a projectile can be inserted manually into a projectile seat in the barrel and eliminates the necessity for any special device such as a loading sleeve. However, in rifles hitherto known, a displaceable compression cylinder creates certain problems of which the problem of attaching the tension draw bar to the cylinder plays an important role because the attachment means must allow for a certain pivot movement of the tension draw bar and must not prevent the displacement of the cylinder and the piston in relation to the casing and in relation to each other.

SUMMARY OF THE INVENTION

By extending the compression cylinder at its forward end in order to permit the tension draw bar to be attached in front of the piston's forward position in the compression cylinder, it will be possible to attach the tension lever in front of a conventionally placed trigger guard on the rifle without the direction of the draw force forming such a large angle with the casing that the radial force acting upon the cylinder causes any serious friction problems. Thus a simply shaped, narrow tension mechanism can be attached to the casing's underside and recessed in the stock of the rifle in its rest position, resulting in a smooth and well balanced rifle. As the usual opening in the jacket wall in conventional rifles having displaceable compression cylinder will be dispensed with, the cylinder can be made so short that it reaches in its retracted position slightly behind the tension lever attachment in the casing. The casing too can be made so short that the firing mechanism can be arranged in a separate rear body which also constitutes an attachment for the trigger guard and still be seated in the space available for the lock device in the stock of the rifle. This rear body when attached to the casing closes the same and constitutes a support surface for the piston spring with the consequent the advantage that the casing can be quite smooth on the inside with no shoulder surface as support for the piston spring and therefore can also be entirely open at the rear. The parts in the casing can therefore be easily removed from the rear after the rear body has been detached from the casing. As the rear body therefore may and also must be quite long it is possible to shape it so stable and fasten it so firmly to the casing that the piston spring can be dimensioned for creating a relatively high air pressure in the cylinder compression chamber. It can be mentioned that in a manufactured rifle in accordance with the invention the piston spring effects the piston by about 60 kp.

BRIEF DESCRIPTION OF THE DRAWINGS

FIG. 1 shows a longitudinal creating section of the barrel and casing of the rifle comprising a rear portion of the barrel, a forward portion of the casing, the compression cylinder with attached tension draw bar, the piston and the forward portion of the piston spring, FIG. 2 is a cross section along II—II in FIG. 1 showing the tension draw bar attachment in the compression cylinder, FIG. 2a shows the rear portion of the casing seen from below and illustrates the attachment of the tension draw bar to the cylinder, FIG. 3 shows in longitudinal section a portion of the tension lever and a catch fitted at the same, FIG. 3a shows a detail of the catch, FIG. 4 shows a side elevation of the rear portion of the casing and the back slightly from each other, FIG. 5 shows the rear body and the rear end of the compression cylinder seen from above and FIG. 6 shows the tension lever locking device.

DESCRIPTION OF AN EMBODIMENT OF THE INVENTION

As appears from FIG. 1 a barrel 3 is mounted in a cylindrical tubular casing 4a having an opening 4b on the upper side which is exposed when a compression cylinder, arranged displaceably in the casing 4a and comprising a cylindrical tube 2a and a front piece 2b mounted thereon in gas-tight relationship, is moved rearwardly so that the projectile 5 can be inserted in a projectile seat in the rear end of barrel 3. Cap member 2b has conical funnel-shaped front and rear surfaces and a comparatively thin central portion in which defines a hole 2c constituting a connecting channel between the compression chamber of the compression cylinder and the barrel projectile seat. In order to attain a good seat between front piece 2b and barrel 3 the rear portion of the latter has a corresponding inverted conical shape and is provided with a concentric groove in which is inserted a sealing nylon ring 3a. A spring loaded piston 1a which is movable in the compression cylinder 2a and having sealing rings in close contact with the cylinder wall is in its forward end provided with a conical head 1c of a synthetic rubber which is adapted to conform to the funnel of front piece 2a. Because of these conical end surfaces piston 1a almost reaches projectile 5 in spite of the comparatively long cap member 2b, and "the dead space volume" therefore becomes small upon compression and is further reduced due to the fact that the synthetic rubber head 1c of the piston is deformable so that it penetrates into the central canal 2c of the cylinder front piece 2b when it strikes the same.

For the purpose of displacing the compression cylinder 2a a tension mechanism is arranged beneath the casing comprising a tension lever 8 the rear end of which is pivotally mounted on the tubular shaft 17 (see FIG. 4) and a tension draw bar 6a which is hingedly connected to the tension lever 8 and the forward end portion of which is inserted in a longitudinal slot 4c in the bottom of casing 4a and hingedly connected to cap member 2b. Tension lever 8 has a U-shaped cross section with its open end facing upwards so that it encloses tension draw bar 6a, when it is folded against the casing in its position of rest. The entire tension mechanism is of very simple and inexpensive construction and so narrow that in its locked rest position it lies retracted in the stock of the rifle which would be impossible if tension lever 8 should have its attachment rearwardly of trigger guard 14a. It should then have been necessary to shape the tension lever with portions surrounding trigger guard 14a and thus be so wide that it would have been impossible to retract it into the stock of the rifle and the weapon would be considerably more clumsy.

For the purpose of connecting tension draw bar 6a to the cap member 2b the latter is provided with a cylindrical bore 2d which extends transversely through the cap member and the entire length of the front portion envelope surface. Tension draw bar 6a has a forward upwardly directed end portion which terminates in a cylindrical head 6b on the narrowed neck 6d. Head 6b which has a somewhat shorter diameter than the bore 2d in the cap member is inserted in the bore between two identical plugs 6c which abut against the head 6b with a plane end surface and abut with their other cylindrically shaped end surface against casing 4a and they provide a support for the head (FIG. 2). This form of connection serves to resist a strong pulling force and imports to the tension draw bar 6a limited pivotal movement which is necessary so that it is able to move compression cylinder 2a backwards and forwards as it travels in the bottom slot 4c in the casing when actuated by the tension lever 8. Under high piston spring load and a correspondingly strong pulling force on tension draw bar 6a the radial pressure of the cylinder against the casing is so high however that friction problems occur. This problem has been solved in a very simple manner by making the plugs 6c in the transverse bores of cap member 2b of nylon or the like and so long that they project slightly outside the compression cylinder and thus constitute sliding surfaces for the same with a low coefficient of friction against the casing.

In order to permit the insertion of the head 6b of tension draw bar 6a and plugs 6c in the transverse bore 2d of cap member 2b the bottom slot 4c in the casing extends farther to the rear than is necessary for a normal compression of the piston spring and transcends at its rear end into a transverse slot or opening 4d through which said parts can be inserted into the cap member (FIG. 2a).

Piston stem 1b is provided with a conventional hook (not shown) for catching the piston on a sear in the firing mechanism when compressing the piston spring. In view of the high spring loads which are rendered possible through the invention it is however highly desirable for safety reasons that also the compression cylinder is locked in its retracted position during the loading operation as the risk exists that the trigger may be touched unintentionally and thus release the piston. The length and shape of the rear body 14 renders it possible to store therein a safety switch for the compression cylinder. It can, as shown in FIG. 4 and FIG. 5, be arranged as a spring loaded rocker arm 15 which is partly retracted in rear body 14 and casing 4a and the forward end of which is provided with a fairly deep recess forming a hollowed out hook which is automatically inserted in an opening 16 in the rear portion of cylinder 2a and thus retains it in cocked position. In order to release the cylinder pressure is exerted against the rear end of the rocker arm to overcome the spring load and in the case of the provision of an undercut hook the cylinder must simultaneously be drawn slightly backwards.

The air rifle is also provided with a locking device for locking the tension mechanism in retracted position and thereby also the compression cylinder in its forward position. It consists of a latch pin 7 at the front end of casing 4a fastened to the bottom of the latter and a catch clamp 9a which is arranged slidably at the forward end of tension lever 8 and the rear shank of which is bent inwards and is held in engagement with latch pin 7 in a recess at the bevelled free end of the latter under influence of a forwardly directed spring load which acts upon the forward shank. Catch clamp 9a is slidably mounted between the bottom surface of the U-shaped tension lever 8 and a grip block 11 which is situated between the flanges or legs of the tension lever and a shaft 9b which is provided with two end flanges each of which is pivotally fitted in a hole in the flanges or leg of the tension lever and clasp catch clamp 9a. Shaft 9b is thus locked in place. Grip block 11 which is intended to save the hand from injury when compressing the piston spring, is provided with a forwardly open bottom hole in which is inserted a helical spring 10 acting upon the forward leg of catch clamp 9a.

Tubular shaft 17 which keeps together casing 4a and rear body 14 and also constitutes mounting shaft for tension lever 8 forms also an excellent means of attachment for attaching to the stock of the rifle. With a stock bolt through the tubular shaft 17 as the only attachment means to the rear of barrel 3 all of said three parts are directly anchored to the stock. The whole system can also be assembled, test shot and trimmed disconnected from the stock of the rifle and then can be easily mounted in the latter as an assembled unit. Another advantage is that the folding of the stock is very simple.

In the embodiment described above, all of the advantages which can be gained through the invention are utilized. However, other embodiments are also possible within the scope of the invention as set forth by the patent claims. Thus the forward located attachment points for the tension lever and the tension draw bar are also possible in a gun which has the firing mechanism arranged inside the casing with the same great advantage of providing a smooth and well balanced weapon.

We claim:
1. A rifle comprising:
 a. a tubular casing having a longitudinal slot in its bottom;
 b. a barrel supported by said casing and having a bore providing a projectile seat;
 c. a compression cylinder slidably mounted within said casing;
 d. piston means movable in said casing;
 e. spring means within said compression cylinder for actuating the piston;
 f. sealing means connected to the forward end of said compression cylinder so as to be slidably mounted therewith and forming a sealing end wall against the barrel, said sealing means comprising a bore extending transverse to the axis of the casing and having an opening facing downwardly which opens into said longitudinal slot and having additional openings on either end thereof which face opposing sections of the inner wall of said casing;
 g. tension means arranged on the underside of the rifle for compressing the spring means and including a tension lever pivotally mounted at the rear of said casing; a tension draw bar, one end of which projects into the casing through said longitudinal slot and the other end of which is pivotally connected to said tension lever; said tension draw bar having a forward head portion pivotally mounted in said bore to permit said tension draw bar to be pivoted relative to the axis of the bore; and h. plug means removably mounted in said bore, said plug means being a separate element from said sealing means and abutting against said forward head portion on each side thereof, said plug means further being shaped and disposed to bear against the casing and against said head portion to hold said head portion in place in said bore by plugging said bore up on either side of said head portion and to act as a bearing surface against said casing for said cylinder.

2. An air rifle according to claim 1, wherein the longitudinal slot in the casing extends rearwardly a distance beyond the point of normal compression of the piston spring means and merges at its rear end into a transverse slot to permit insertion of the forward head portion and the plug means.

3. An air rifle according to claim 1, wherein the plug means consist of a material having a low coefficient of friction and project outside the envelope surface of the sealing end wall and form surfaces for the forward portion of the compression cylinder to provide sliding engagement with the casing.

4. An air rifle according to claim 1, wherein at least the forwardly facing end surfaces of the sealing end wall are funnel shaped coaxially with the bore of the barrel, the rear end surface of the barrel and the forward end surface of the piston means having a corresponding inverse conical shape, the sealing end wall having a canal formed therein which is coaxial with the barrel bore.

5. An air rifle according to claim 4, wherein the piston means has a forward portion abutting against the rear end surface of the sealing end wall and comprising deformable material to permit said portion to penetrate into the canal of the sealing end wall upon impingement therewith.

6. An air rifle according to claim 1, wherein the sealing end wall is shaped as a separate front piece connected to the compression cylinder in air-tight relationship.

7. An air rifle according to claim 1, wherein the rear end surface of the barrel is formed with an annular groove which is coaxial with the barrel bore, a sealing ring being seated therein.

* * * * *